United States Patent [19]
Christopherson

[11] Patent Number: 5,454,550
[45] Date of Patent: Oct. 3, 1995

[54] DAMPENING SHOCK ABSORBER

[75] Inventor: Rollin F. Christopherson, Ogden, Utah

[73] Assignee: Christopherson Group, Milwaukee, Wis.

[21] Appl. No.: 287,666

[22] Filed: Aug. 9, 1994

[51] Int. Cl.⁶ ........................................ F16F 9/56
[52] U.S. Cl. ............... 267/221; 188/322.12; 188/322.16; 267/34
[58] Field of Search .................. 267/34, 64.26, 267/70, 71, 116, 121, 175–177, 150, 221; 280/94; 188/282, 287, 319

[56] References Cited

U.S. PATENT DOCUMENTS

| | | | |
|---|---|---|---|
| 1,177,654 | 4/1916 | Sauveur | 267/29 |
| 2,756,045 | 7/1956 | Savory | 267/177 |
| 3,220,717 | 11/1965 | Altherr et al. | 267/70 |
| 3,372,581 | 3/1968 | Tell | 73/862.621 |
| 3,603,575 | 9/1971 | Arlasky et al. | 267/34 |
| 4,145,036 | 3/1979 | Moonen et al. | 267/34 |
| 4,183,510 | 1/1980 | Kontis | 267/70 |
| 4,405,119 | 9/1983 | Masclet et al. | 267/64.22 |
| 4,406,473 | 9/1983 | Sexton | 280/94 |
| 4,521,002 | 6/1985 | Adorjan et al. | 267/221 |
| 4,736,931 | 4/1988 | Christopherson | 267/34 |
| 4,796,871 | 1/1989 | Bauer et al. | 267/64.11 |
| 4,817,928 | 4/1989 | Paton | 267/219 |
| 4,822,012 | 4/1989 | Sketo | 267/221 |
| 4,826,094 | 5/1989 | Whitley | 188/282 |
| 4,886,256 | 12/1989 | Nishiyama et al. | 267/221 |
| 4,973,854 | 11/1990 | Hummel | 267/64.26 |
| 4,997,201 | 4/1991 | Schaible | 280/668 |

FOREIGN PATENT DOCUMENTS

| | | | |
|---|---|---|---|
| 522734 | 11/1955 | France | 267/64.26 |
| 614285 | 12/1960 | Italy | 267/175 |

*Primary Examiner*—Robert J. Oberleitner
*Assistant Examiner*—Chris Schwartz
*Attorney, Agent, or Firm*—Wheeler & Kromholz

[57] ABSTRACT

A dampening shock absorber for retrofit or original construction with a conventional gas charged or hydraulic shock absorber having a tubular housing. There is provided a compression coil spring and spring retainer members disposed coaxially relative to the tubular housing. The tubular housing, the compression spring and the spring retainer members are longitudinally moveable relative to one another, and at least partially enclosed by a longitudinally movable outer protective sleeve. The sleeve is closed at one end and secured to the distal end of a piston rod extending outwardly of the shock absorber housing. Longitudinally spaced stops are provided on the tubular housing, and on the outer sleeve to limit the longitudinal movement of the operating and interacting components. Another embodiment of the invention provides an adjustment mechanism on the outer sleeve for adjusting the distance between the longitudinally spaced stops.

13 Claims, 4 Drawing Sheets

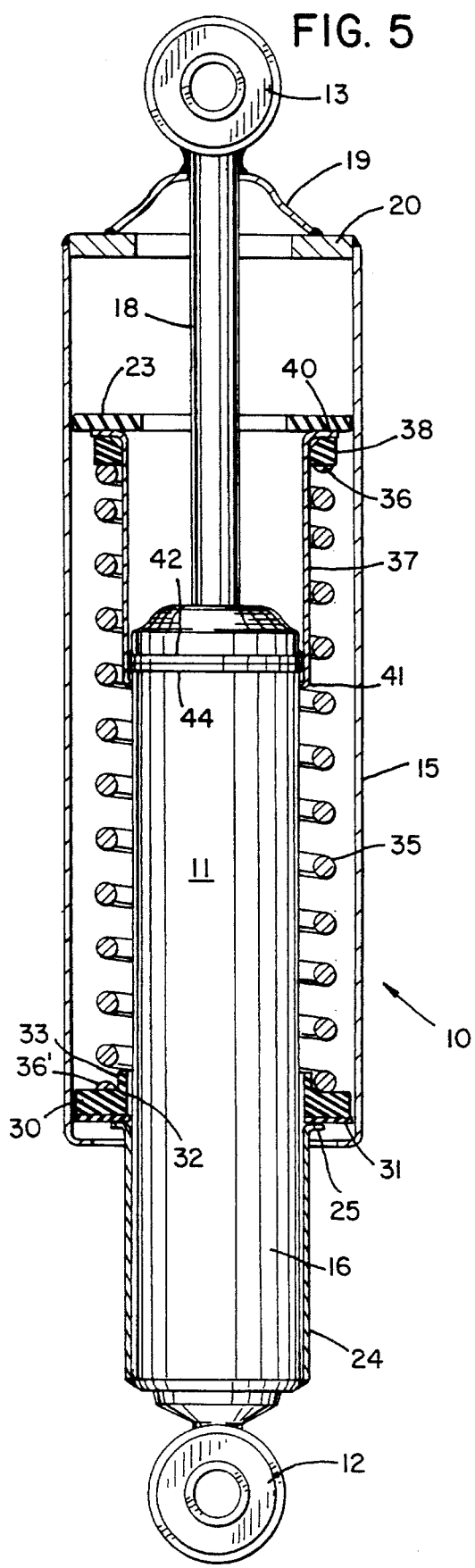
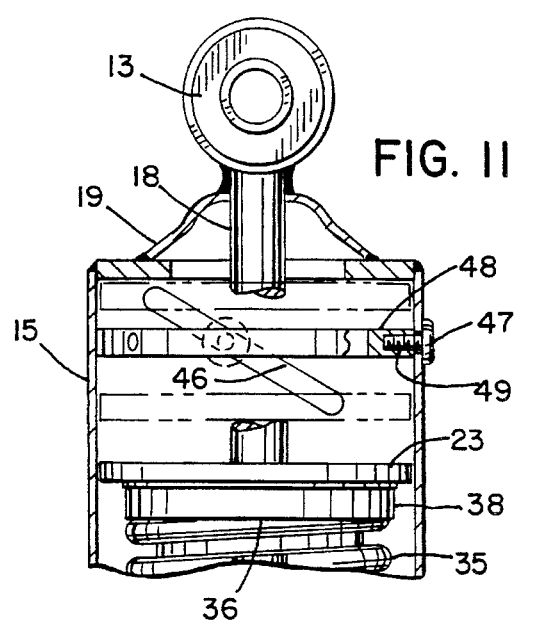
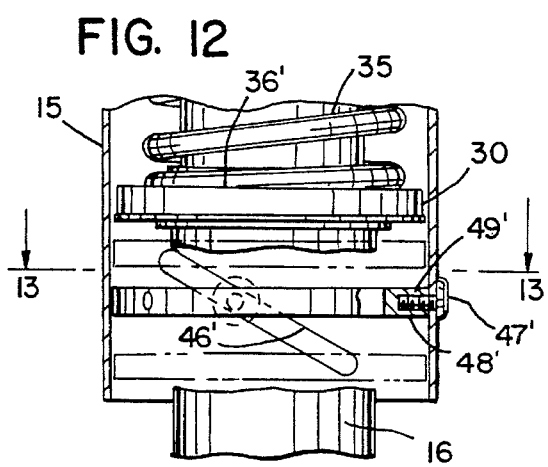
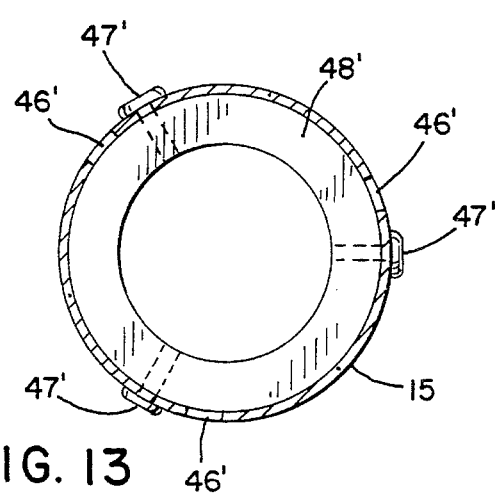

DAMPENING SHOCK ABSORBER

BACKGROUND OF THE INVENTION

This invention relates to a vehicle shock absorber, and particularly to a means for dampening the action of vehicle's suspension travel.

The novel concept of this invention adopts functions similar to those of the dampening shock absorber described and claimed by the present inventor in his Christopherson U.S. Pat. No. 4,736,931. As disclosed therein, the shock absorber configuration provided a retrofit of a spring assembly to a conventional gas charged or hydraulic shock or strut that involved an outer sleeve telescoped over an inner sleeve containing a piston movable against hydraulic or gaseous resistance. The patented spring assembly consists of a coil spring surrounding a tubular sleeve in telescoping relationship with a conventional tubular shock absorber configuration, a pair of oppositely disposed longitudinal grooves in the outer tubular sleeve, and oppositley disposed pairs of spring retaining clips each having inwardly projecting bosses or fingers slidably received by the respective grooves, and further including outwardly extending flanged areas arranged to receive the coil spring. Longitudinally spaced retaining rings are each secured around the inner shock absorber sleeves to act as stops for the respective spring retainer clips. Another embodiment of the patent provides an adjustable collar positioned between a retaining clip and its end of the coil spring. The spacing between retaining clips may thereby be changed to provide preload adjustment of the compressive force exerted by the coil spring against the collar.

It has been observed that the primary factor in vehicle ride control is the vehicle spring rate. Spring rate has been defined as pounds/deflected inch. Using coil suspension for purposes of illustration, a soft spring would need to be deflected more than a stiff spring to support a given vehicle weight. Consequently, a soft spring has a longer free length than a stiff spring. When two identical vehicles of equal ride height are compared, soft springs on one and stiff springs on the other, the ride height will be maintained with both vehicles being driven in a straight line on level pavement. However, under roll and pitch conditions, control would be better in the stiffly sprung vehicle, because stiff springs unload sooner.

For a better understanding, specific terminology has been used for purposes of the following discussion. "Roll" refers to tilting of the vehicle's sprung mass (passenger space and vehicle body) when cornering. Roll is caused by the extension and/or compression of the vehicle's main suspension springs above or below resting ride height (equilibrium). Equilibrium, in this case, being the neutral resting ride height resulting from the weight of the sprung mass (passenger, cargo, body, trim, etc.) as supported by suspension springs. Roll has traditionally been controlled by so-called sway bars. "Pitch" refers to rocking the vehicle front to back. This is usually caused by road anomalies. Pitch has traditionally been controlled by conventional shock absorbers. Sway bars have no effect on pitch. "Float" or "bounce" refers to undesirable extension of the suspension system past normal ride height. This condition is also caused by road anomalies. Here again, sway bars have no effect on control of the vehicle.

Standard shock absorbers without "negative boost" allow the center of gravity to shift to an angle which may cause discomfort to the driver and passengers, and materially affect control of the vehicle. This shift is particularly true during a roll while the vehicle is cornering. In a vehicle such as a van or step-van emergency medical transport, where the center of gravity is relatively high, roll may interfere with the attempts to stabilize emergency patients. Rollovers have been known to occur during cornering, where vehicle suspension has not been considered carefully. Two factors are responsible for this condition. The most obvious factor—stiff springs support more weight in a given amount of spring travel than do soft springs. This condition, for example, will occur on the outside of a turn. The less obvious factor lies in the fact that, since soft springs have a longer free length, they will continue to lift more when cornering. This condition occurs on the inside of a turn.

It will be apparent that the distance traveled by the load to reach equilibrium is greater in a soft sprung vehicle than in a stiffly sprung vehicle. The travel distance required to load the springs (suspend) is the greatest factor in most ride control problems relating to pitch, roll or float conditions.

The improved dampening shock absorber of this invention provides a neutral zone travel area affording a softer ride during straight road cruising on a level surface. The improvement also provides negative boost (pull-down) to the shock absorbers when the vehicle (sprung mass) tends to lift beyond resting ride height, i.e., during cornering wherein the inside springs unload, lifting the vehicle (sprung mass) while the outside springs compress below resting ride height. The opposite action occurs during positive boost (pushup) of the dampening feature of the invention wherein the vehicle's suspension compresses below a pre-established neutral zone travel.

Shock absorbers with dampening features further contribute towards compensation for uneven load suspension distribution caused by applying trailer hitch loads. In such case, the rear suspension is subjected to forces causing the front end of the vehicle to lift and thereby allow the front springs to lift the vehicle (sprung mass) above resting ride height. At the same time, the load on the rear wheel suspension is increased, thereby lowering the vehicle (sprung mass) to a position below resting ride height.

SUMMARY OF THE INVENTION

Advantages of providing both negative and positive boost dampening systems to conventional hydraulic and gaseous shock absorbers may be found in the novel configuration provided by this invention. The principal advantageous lies in a novel assembly which may be faciley and inexpensively manufactured and fabricated. The overall design differentiates from the past dampening systems, including the device described and claimed in the previous Christopherson patent. Christopherson U.S. Pat. No. 4,736 931 disclosed a configuration providing similar functions not entirely unlike those provided by the device of the present invention, However, dampening shock absorbers manufactured in accordance with the teachings of Christopherson presented difficulties in manufacture and fabrication. The operating parts require separate relatively complex pressing, notching and stamping techniques. Assembly also requires special forming and assembly tools. Specially designed jigs and fixtures. Are required for temporarily compressing the coil spring during insertion of spring retainers. These factors each contribute to frustration and time consuming efforts upon assembly operating personnel.

The present configuration permits convenient and facile retrofit to a conventional a tubular shock absorber. The shock absorber housing is enclosed across one end, and is partially enclosed at its opposite end to slidably receive a longitudinally extending piston rod. The present configuration provides an outer sleeve for telescoping over the tubular housing. A coil spring and a spring retainer assembly are provided, with the spring being disposed circumjacent to the tubular housing and retained at one end with a simple a cuplike spring retainer member that also surrounds the tubular housing. A flanged, washerlike retainer member serves to hold the coil spring at its opposite end. Suitable stop means are provided to limit motion of the outer sleeve and coil spring as required to provide desired compensating and dampening effects.

BRIEF DESCRIPTION OF THE DRAWINGS

FIG. 5 is a longitudinal view, partly in section, of the assembled shock absorber of FIG. 4.

FIG. 11 is a fragmentary sectional view of the upper end of another embodiment of this invention, and showing means of adjusting positive boost engagement point and the neutral zone which adjusts for vehicle ride stiffness.

FIG. 12 is a fragmentary longitudinal view of still another embodiment of this invention which may be used to adjust negative boost, which compensates for vehicle ride height differences, or may be combined with the embodiment of FIG. 11.

FIG. 13 is a cross sectional view taken along lines 13—13 of FIG. 12.

DESCRIPTION OF THE PREFERRED EMBODIMENTS

Figure 1:
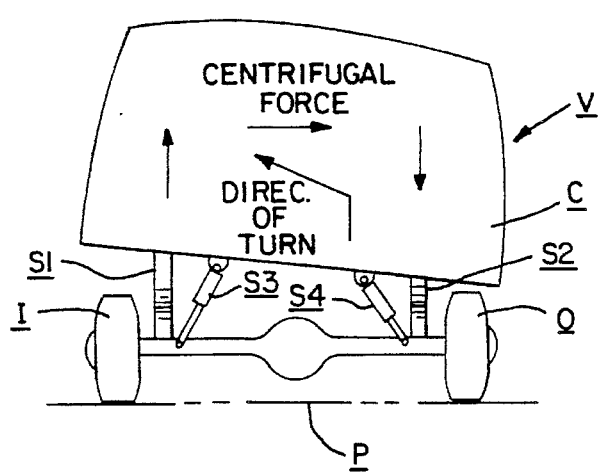
FIG. 1 is a graphic representation viewed from the rear end of a vehicle having a conventional shock absorber suspension system, and illustrating effects of cornering on that system.
Figure 2:
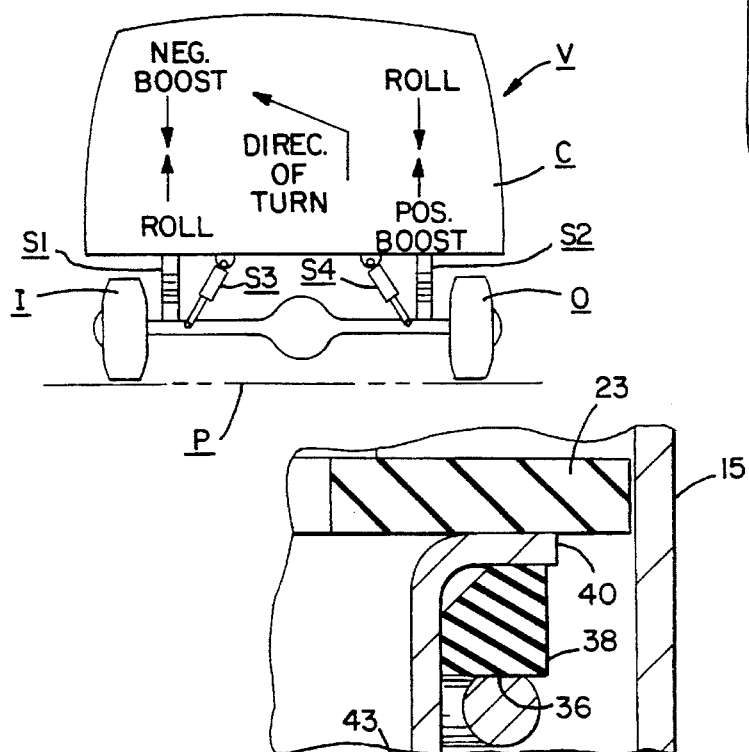
FIG. 2 is a graphic representation also viewed from the rear end of a vehicle, and illustrating the effects of cornering after installation of a shock absorber suspension system made in accordance with the present invention.

FIGS. 1 and 2 have been submitted as an aid in understanding the functioning of the various components of the dampening shock absorber of this invention. FIG. 1 illustrates the condition of the suspension system of a conventional motor vehicle V, as the vehicle "corners" during a left-hand turn. This condition is known as "Roll", wherein the inside springs S1 unload and lift the vehicle body, and their respective shock absorbers S3 extend. At the same time, the outside springs S2 compress along with their respective shock absorbers S4 via action of centrifugal forces exerted upon the vehicle V during cornering.

Next, referring to the view of FIG. 2, it will be observed that the vehicle V has been stabilized during cornering by the interaction of the components of the dampening shock absorbers S3 and S4, as will hereinafter be explained. That is, during cornering to the left, the roll (lift) at the left side of the vehicle V is immediately compensated by "negative boost" (pull-down) exerted by the shock absorber S3, whereas the compression on the right side of the vehicle's suspension is compensated by "positive boost" (push-up) engaging the interacting components after neutral zone travel.

Figure 3:
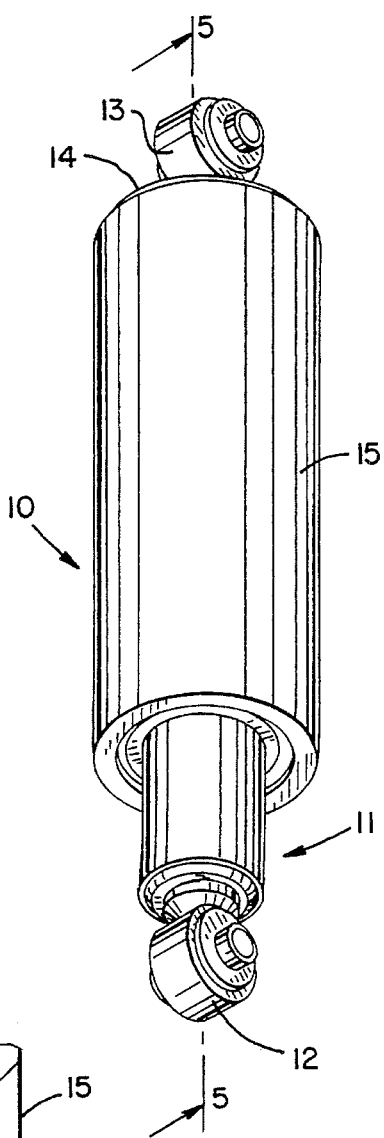
FIG. 3 is a perspective view of the external features of a dampening shock absorber of this invention.

The view of FIG. 3 illustrates the compact, fully assembled embodiment of the improved dampening shock absorber 10. This embodiment may be retrofitted to a conventional hydraulically or pneumatically operated shock absorber 11 terminating at its lower end mount 12. An upper mount 13 is secured to both the distal end of a reciprocating piston rod (not shown in this view) and to the upper end cap 14 of a telescoping outer protective sleeve or dust cover 15.

Figure 4:
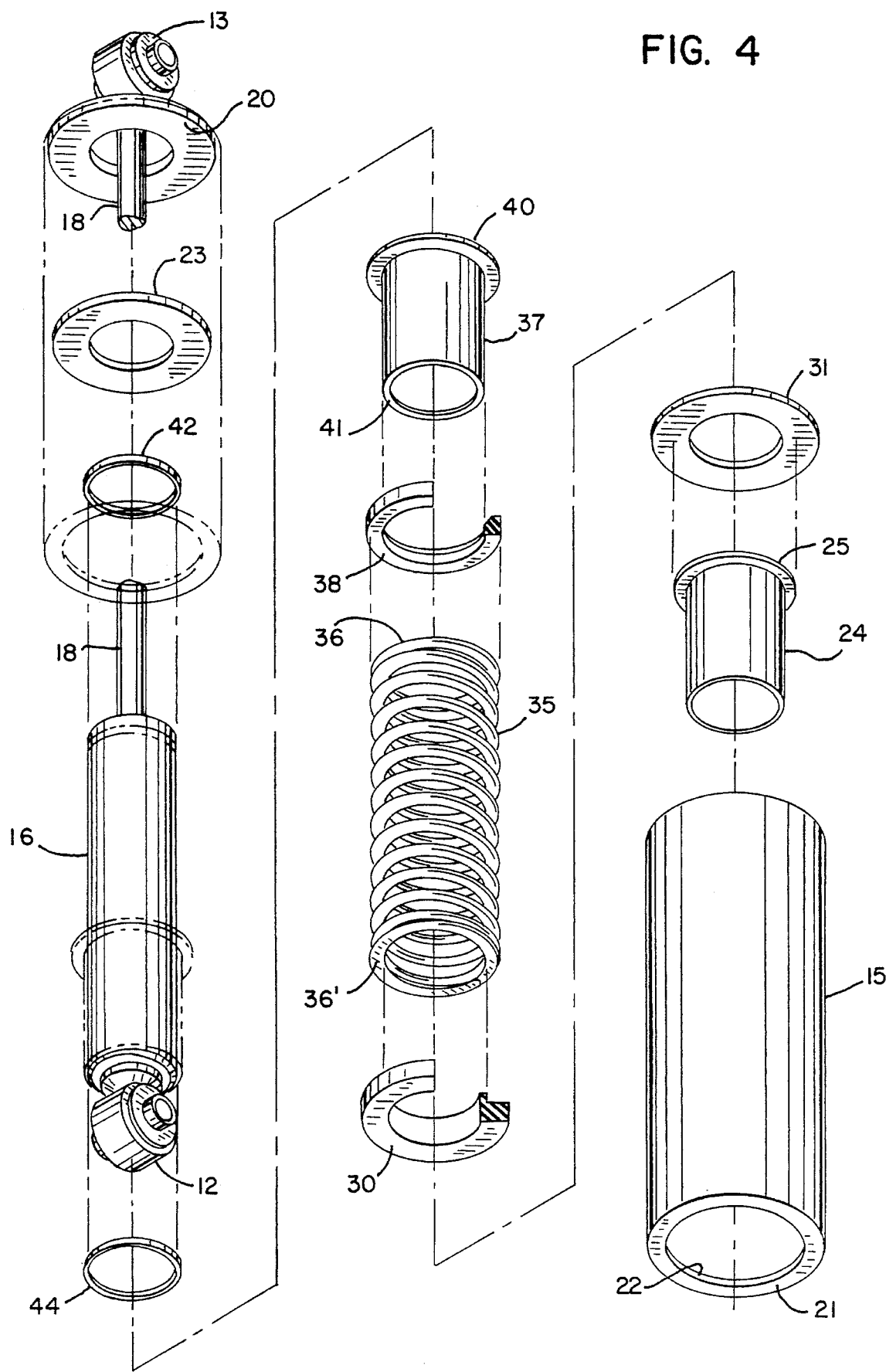
FIG. 4 is an exploded view, divided into three sections, and illustrating, in detail, the various interrelating components of an embodiment of a shock absorber of this invention.

The interacting and operating components of the shock absorber 10 will next be described with particular attention to the views of FIGS. 3, 4 and 5. As stated previously, the components may be retrofitted to a conventional shock absorber 11, which may be either a hydraulic or gas charged device.

The shock absorber 11 contains the usual piston rod 18, shown in extended position in FIG. 5, and having its upper end secured by welding or other means to an upper mount 13. A cap 19 is also secured to the upper end of a piston rod 18 by welding, and is further secured to a partially enclosed endwall (positive boost surface) 20, as well as being secured by welding to the outer sleeve 15. The tubular outer sleeve 15 is shown with an annular cross section. However, the cross section of the sleeve 15 may be of any suitable configuration adaptable for slidably receiving the shock absorber body 16. The lower, open end of the sleeve 15 may be formed as an inwardly projecting flange 21 by either a metal spinning or metal drawing operation, and thereafter stamping and/or coining an opening 22 for slidably receiving the shock body 16. The endwall 20 serves as a stop or contact point for an upper noise dampening thrust washer 23 slideable within the telescoping, tubular outer sleeve 15 and surrounding the piston rod 18 to control and limit "positive boost", as will hereinafter be described.

A tubular intermediate sleeve (lower spring stop) 24 surrounds the shock body 16 and may be secured to the lower end thereof by means welding, crimping, sweating or similar securing means. The sleeve 24 is provided with an outwardly extending flange 25 to provide a bottom stop or rest for supporting a lower spring retainer 30. The retainer 30 is preferably fabricated from an appropriate plastic material. A lower noise dampening thrust washer member 31 is preferably disposed between the flange 25 and the lower surface of the spring retainer 30 to provide sound and impact insulation. It will be noted that the retainer 30 is provided with an aperture 32 for slidable relationship with the shock body 16, and is further formed with a shoulder portion 33 for receiving the inner diameter of the coil spring 35. The coil compression spring 35 is preferably ground flat at both ends 36, 36' to seat squarely and maintain the column traveling straight during operation thereof.

Figure 6:
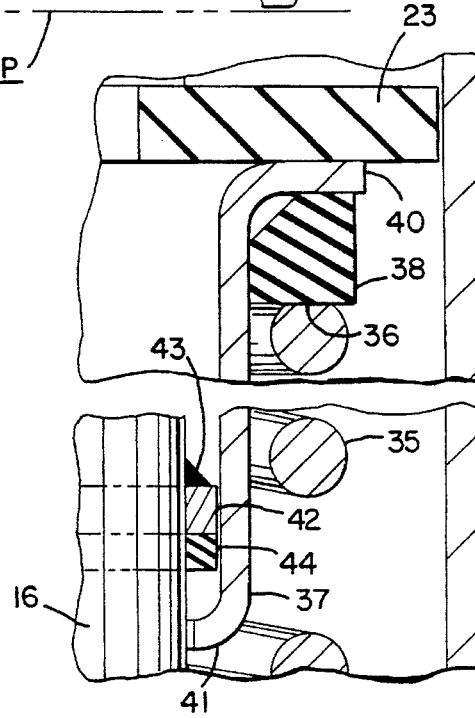
FIG. 6 is a fragmentary sectional view illustrating the arrangement of components, including the cuplike spring retainer member of the embodiment of FIGS. 4 and 5.

The upper end portion of the coil spring 35 surrounds a cuplike spring retainer 37, and seats against a non-metallic retainer washer 38. The compression coil spring 35 and washer 38 are retained by the outwardly extending flange 40 of the retainer 37. As shown in FIG. 5, the noise dampener washer 23 is attached against the upper surface of the flange 40. The lower end of the cuplike spring retainer 37 is flanged inwardly at 41 to define an opening for slidably receiving the shock absorber body 16. The cuplike spring retainer 37 is retained against the upper bias of the coil spring 35 by engagement of the flange 41 and an outwardly extending annular ring 42 secured by weldment 43 (See FIG. 6) to the outer surface of the body 16. It is also preferred, in this case, to provide a sound insulating washer 44 interposed between the inturned flange 41 of the upper retainer member 37 and the ring 42.

Figure 7:
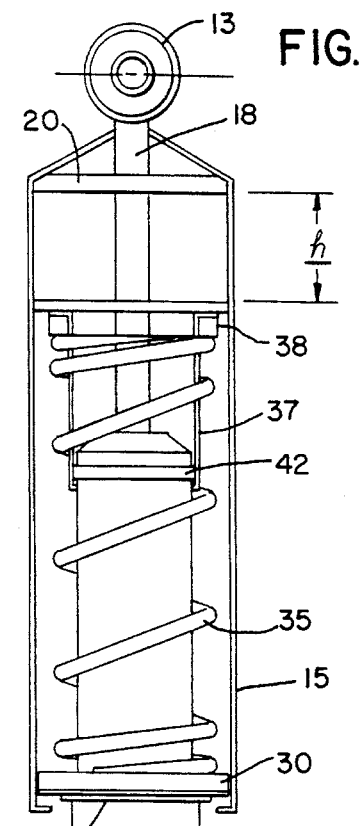
FIGS. 7–10, inclusive, are outline representations of the dampening shock absorber of this invention, with certain details removed to more clearly illustrate the relationship of interacting components during various operating conditions affecting operation of the shock absorber of this invention.
Figure 8:
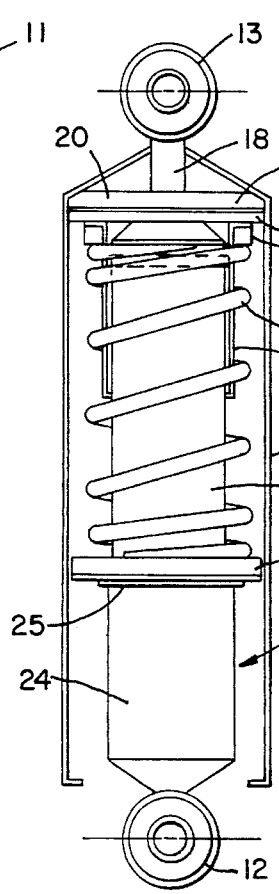

Operation of the dampening shock absorber will next be explained with reference to FIGS. 7–10, inclusive. FIG. 7 shows the assembly at rest with the components positioned relative to one another at an initial setting h, known as the "neutral zone". The height h establishes room for neutral zone travel to allow for unaffected compressive suspension travel desired during constant, minor road surface fluctuations encountered during straight ahead cruising. The initial height adjustment may be made on site, or as a retrofit, as will later be explained in connection with another embodiment of this invention. The relationship between the relative positioning of the components as shown FIGS. 7 and 8 demonstrates the shock absorber traveling through the neutral zone. The comparison further shows how the shock absorber 11 allows the vehicle a smooth ride unaffected by the coil spring 35.

Figure 9:
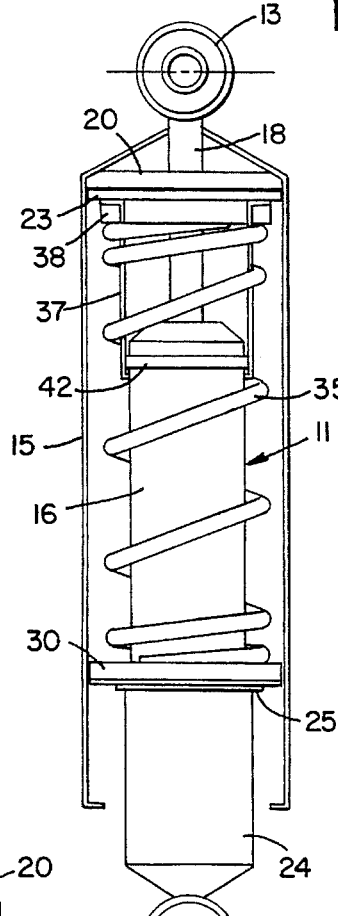

FIG. 9 is illustrative of the relative position of operating components when the vehicle turns, starts, stops, or encounters a bump or pothole. Here, "positive boost" will be achieved by operation of the dampening coil spring. The piston (not shown) and its piston rod 18 of the shock absorber 11 will have previously been forced downwardly relative to the position shown in FIG. 8. Also shown in the view of FIG. 8, the upper noise dampening thrust washer 23 will be forced against the abutment provided by the endwall stop 20 of the tubular outer sleeve 15. Since the piston rod 18 is secured to the outer, telescoping sleeve 15, the sleeve 15 will be forced downwardly relative to the shock absorber body 16. Continued downward movement of the piston rod 18 and the outer sleeve 15 will provide positive boost to the vehicle by compressing the dampening coil spring 35 to the position shown view of FIG. 9. It will be further noted that the shock absorber 11 has been moved upwardly relative to the sleeve 15, with the upper noise dampening thrust washer 23 and the upper retainer member 37 being in abutting relationship with the endwall stop 20.

Figure 10:
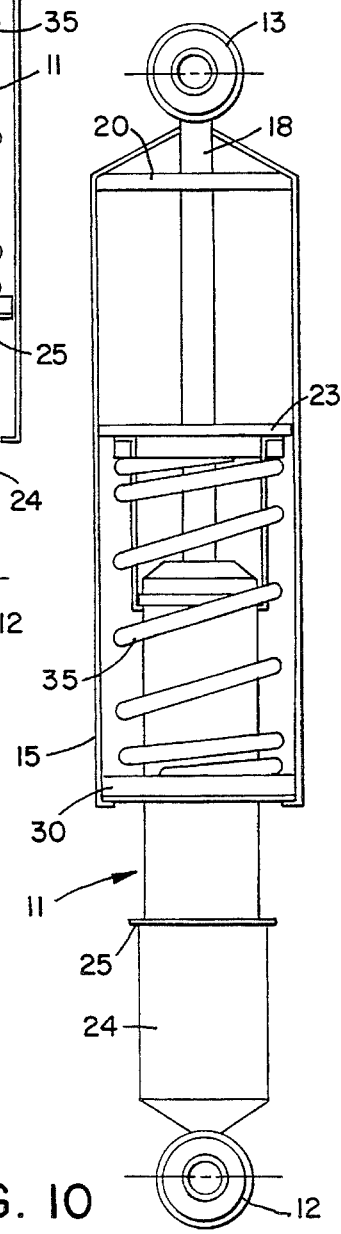

The view of FIG. 10 illustrates the relationship of the operating components during cornering of the vehicle, and as this action affects the suspension unloading against the inside corner sprung mass of the vehicle. The piston rod 18 and the attached outer sleeve 15 have each risen relative to the top of the flange 25 of the lower spring stop 24. This action results in a negative boost (pull-down action), which counteracts the lift of the unloading vehicle spring on the inside suspension system and pulls down on the sprung mass.

Thus, when a vehicle is placed on a flat road surface, the main vehicle supporting springs S1, S2 (See FIGS. 1 and 2) are compressed to a point where they each suspend the vehicle weight in a state of equilibrium (FIG. 7). Ride anomalies, such as pitch, roll or float, materially affect this state of equilibrium. The device of this invention opposes the lifting motion of the vehicle suspension springs in an effort to maintain level (horizontal) trim. This is accomplished by negative boost action provided by the respective coil springs in their effort to reach full length, thus opposing the lifting action upon the vehicle.

Another embodiment of the invention is exemplified with reference to the views of FIGS. 11–13, inclusive. On site positive boost adjustments and negative boost adjustments at ride height adjustment may be made with the aid of one or more camming mechanisms. These mechanisms have particular application to retrofitting existing vehicles, and to vehicles adapted, after manufacture, for application of trailer hitches and other means of change of pre-established road height parameters. In the case of using either, or both, modifications of FIGS. 11 and/or 12, it will be observed that the outer sleeve 15 is slotted to respectively provide camming ramps 46,46'.

In FIG. 11 the periphery of the sleeve 15 is provided with one or more inclined slots 46 at its upper end, each slot being arranged to receive an adjustment screw 47 threadingly engaging an internally disposed annular ring 48. The ring 48 may be moved upwardly or downwardly as the annular ring 48 is rotated. With the screw 47 in the loosened position, the screw shaft 49 acts as a cam follower riding the inclined plane or ramp provided by the inclined slot 46. The annular ring 48 thereby serves to raise or lower the stop means, formerly provided in the configuration of FIGS. 3–5, inclusive. The movement limits are shown in phantom lines in both embodiments respectively presented in the views of FIGS. 11 and 12. The camming movement provides adjustable means interposed between the original stop means provided by the endwall 20 and the noise dampening thrust washer 23. This adjustment provides readily accessible means for adjusting the positive boost at, depending upon weight of vehicle. The same type of adjustment for negative boost at ride height may be provided by positioning the inclined slot 46' in the lower end of the sleeve 15. One, or both slots 46,46' may be provided as desired.

While preferred embodiments of the present invention in a dampening shock absorber have been shown and described herein, it should be understood that this disclosure is made by way of example only. Variations to the structure of the invention and to its use are possible without departing from the subject matter coming with the scope of the following claims, which claims I regard as my invention.

What is claimed is:

1. In a dampening shock absorber comprising a unitary tubular shock absorber housing that is enclosed across one end, a pair of longitudinally spaced stop members each extending radially outwardly relative to said housing, a first mounting means extending from said one end, said housing being partially enclosed at its opposite end to slidably receive a longitudinally extending piston rod, said piston rod terminating at its distal end in a second mounting means, and a compression coil spring extending longitudinally with and circumjacent to said tubular shock absorber housing; the improvement comprising, a) an outer tubular sleeve surrounding said shock absorber housing and said compression coil spring, said sleeve being secured at one end to said piston rod and including an inwardly extending peripheral flange portion partially enclosing the opposite end thereof and arranged to slidably receive said shock absorber housing;

b) a coil spring retainer assembly including first and second spring retainer members,
        1) said first spring retainer member comprising a tubular retainer member slidably disposed between said shock absorber housing and said compression coil spring, said tubular member defining an inwardly extending flanged portion arranged for abutting engagement with one of said pair of stop members, said tubular retainer member further including at, its opposite end, an outwardly extending flanged portion arranged to receive one end of said compression coil 2) said second retainer member housing and being movable longitudinally relative thereto, said collar having a surface arranged for abutting engagement with the opposite end of said compression coil spring, and the opposite surface of said collar being arranged to abut a second of said pair of stop members.

2. The dampening shock absorber of claim 1, wherein the wall of the outer sleeve is provided with at least one angularly disposed, elongated camming slot, an enclosed, longitudinally movable, threaded annular ring and an adjustment screw with a threaded stem extending through said slot and engageable with said ring, whereby said screw stem provides a cam follower for said camming slot to raise or lower said ring with respect to said outer sleeve.

3. The dampening shock absorber of claim 2, wherein said outer sleeve is provided with a pair of longitudinally spaced camming slots, a pair of adjustment camming screws and a pair of annular rings.

4. The dampening shock absorber of claim 1, wherein said second of said pair of stop members located on the shock absorber housing comprises a sleeve secured to said housing and including a radially extending flanged portion.

5. The dampening shock absorber of claim 4, wherein a noise dampening thrust washer surrounds said shock absorber housing and is interposed between said annular collar and the radially extending flanged portion of said second stop member sleeve.

6. The dampening shock absorber of claim 1, wherein a sound insulating washer surrounds said shock absorber housing and is interposed between said inwardly extending flanged portion of said tubular retainer member and said one of said pair of stop members.

7. The dampening shock absorber of claim 1, wherein said outer sleeve provides internally located stop means for intercepting longitudinal motion of said first spring retainer.

8. The dampening shock absorber of claim 1, wherein opposite end coils of said compression spring are respectively provided with substantially planar surfaces lying substantially normal to the longitudinal axis of said spring.

9. The dampening shock absorber of claim 1, wherein the outer surface of the outwardly extending flange of said first spring retainer member is in abutting engagement with a thrust washer slidably retained by and longitudinally movable relative to said outer sleeve.

10. The dampening shock absorber of claim 1, wherein a sound and impact insulating washer is seated between said outwardly extending flange of said tubular retainer member and said one end of said coil spring.

11. A dampening shock absorber comprising a unitary tubular housing including a first mounting means extending from one end of said housing, said housing being partially enclosed at its opposite end to slidably receive a piston rod, said piston rod terminating at its distal lend in a second mounting means, the outer surface of said housing further including a pair of longitudinally spaced first and second stop members, a). a compression coil spring circumjacent to and longitudinally movable relative to said housing, b). a first coil spring retainer disposed entirely externally of said unitary shock absorber housing and arranged for longitudinal movement with respect to said housing, said first retainer including means for seating engagement with one end of said coil spring, said first spring retainer further being arranged for abutting engagement with said first stop member, c). a second spring retainer also being disposed entirely externally of said unitary shock absorber housing and arranged for longitudinal movement relative to said tubular housing, and including means for seating engagement with the opposite end of said coil spring, said second spring retainer member being arranged for abutting engagement with the second stop member, and d. an outer tubular sleeve surrounding and slidably receiving said shock absorber housing and said compression coil spring, said outer sleeve being secured at one end to said piston rod and including means for alternative abutting engagement with said first and second spring retainers.

12. The dampening shock absorber of claim 11, wherein said first spring retainer comprises a tube having an outwardly extending flange at one end thereof for seating engagement with said coil spring and defining an inwardly extending flange at its opposite end for abutting engagement with said first stop member.

13. The dampening shock absorber of claim 11, wherein said second retainer member comprises a relatively flat collar having a shouldered surface for seating engagement with said coil spring, and further including an oppositely disposed surface arranged for abutting engagement with said second stop member.

* * * * *